US009672752B2

(12) United States Patent
Obae et al.

(10) Patent No.: US 9,672,752 B2
(45) Date of Patent: Jun. 6, 2017

(54) LEARNING ASSISTANCE SERVER, LEARNING ASSISTANCE SYSTEM, AND LEARNING ASSISTANCE PROGRAM

(71) Applicant: FLENS INC., Tokyo (JP)

(72) Inventors: Takahiro Obae, Yokohama (JP); Masahiro Koizumi, Yokohama (JP); Makoto Miyokawa, Machida (JP)

(73) Assignee: FLENS INC., Tokyo (JP)

( * ) Notice: Subject to any disclaimer, the term of this patent is extended or adjusted under 35 U.S.C. 154(b) by 302 days.

(21) Appl. No.: 14/367,661

(22) PCT Filed: Nov. 21, 2012

(86) PCT No.: PCT/JP2012/007486
§ 371 (c)(1),
(2) Date: Jun. 20, 2014

(87) PCT Pub. No.: WO2013/102966
PCT Pub. Date: Jul. 11, 2013

(65) Prior Publication Data
US 2015/0079576 A1 Mar. 19, 2015

(30) Foreign Application Priority Data

Jan. 6, 2012 (JP) .................................. 2012-001419

(51) Int. Cl.
*G09B 7/00* (2006.01)
*G09B 7/07* (2006.01)
(Continued)

(52) U.S. Cl.
CPC ............... *G09B 7/00* (2013.01); *G06Q 50/20* (2013.01); *G09B 7/02* (2013.01); *G09B 7/06* (2013.01); *G09B 7/07* (2013.01)

(58) Field of Classification Search
CPC ............. G09B 7/00; G09B 7/07; G09B 7/073
See application file for complete search history.

(56) References Cited

U.S. PATENT DOCUMENTS 5,572,678 A * 11/1996 Homma ............. H04Q 11/0478
370/410
6,086,381 A * 7/2000 Downs ..................... G09B 5/14
434/322
(Continued)

FOREIGN PATENT DOCUMENTS

JP  H10-149087 A   6/1998
JP  2001-296788 A  10/2001
(Continued)

OTHER PUBLICATIONS

PCT, "International Search Report for International Application No. PCT/JP2012/007486".

*Primary Examiner* — Peter Egloff
(74) *Attorney, Agent, or Firm* — Manabu Kanesaka

(57) ABSTRACT

A learning assistance server 10 receives, for each question, the answer information indicating the answer to each question in the test questions input to an answer input area 103 on the test screen; updates the test progress information by registering the answer indicated in the received answer information in the test progress information about an appropriate student; and determines with reference to the competitive relationship information whether the student whose test progress information has been updated is linked as the competitor student. When determining that the student is linked as the competitor student, the learning assistance server 10 generates the competitor progress information based on the test progress information about the competitor student. To display the progress in a competitor progress display area 101 that is provided on the test screen and that displays the progress of the competitor student indicated in the competitor progress information, the learning assistance server 10 transmits the generated competitor progress information to the student terminal of the student to whom the competitor student is linked. This can increase the registered (Continued)

user's (student's) motivation for learning and thus can provide a learning assistance technique that can enhance the learning effect.

2 Claims, 16 Drawing Sheets

(51) Int. Cl.
    *G06Q 50/20*     (2012.01)
    *G09B 7/02*     (2006.01)
    *G09B 7/06*     (2006.01)

(56) References Cited

U.S. PATENT DOCUMENTS

| | | | |
|---|---|---|---|
| 2006/0029920 A1* | 2/2006 | Bruno | G09B 7/06 434/323 |
| 2006/0160055 A1 | 7/2006 | Osoegawa | |
| 2008/0256015 A1* | 10/2008 | Woolf | A63F 13/12 706/48 |
| 2009/0186328 A1* | 7/2009 | Robinson | G09B 5/14 434/350 |
| 2010/0105456 A1 | 4/2010 | Marufuji | |
| 2011/0318723 A1* | 12/2011 | Jeong | G09B 7/08 434/350 |
| 2012/0288841 A1* | 11/2012 | Srinivas | G09B 7/02 434/350 |

FOREIGN PATENT DOCUMENTS

| | | |
|---|---|---|
| JP | 2001-312203 A | 11/2001 |
| JP | 2004-309872 A | 11/2004 |
| JP | 2009-300877 A | 12/2009 |
| WO | 03/050782 A1 | 6/2003 |
| WO | WO 2011/061758 A1 * | 5/2011 ............. G06F 19/00 |

* cited by examiner

Fig.2

STUDENT INFORMATION

| STUDENT ID | NAME | ADDRESS | CONTACT NUMBER | GRADE | CLASS | ACADEMIC RESULT | ... |
|---|---|---|---|---|---|---|---|
| S00001 | SUZUKI ICHIRO | ... | ... | GRADE 6 | 6A | ... | ... |
| S00002 | YAMADA JIRO | ... | ... | GRADE 6 | 6B | ... | ... |
| S00003 | YAMAMOTO HANAKO | ... | ... | GRADE 5 | 5C | ... | ... |
| S00004 | INOUE KAZUO | ... | ... | GRADE 6 | 6A | ... | ... |
| S00005 | TAKAHASHI RYOKO | ... | ... | GRADE 4 | 4A | ... | ... |
| ⋮ | ⋮ | ⋮ | ⋮ | ⋮ | ⋮ | ⋮ | ⋮ |

Fig.3

GROUP INFORMATION

| GROUP ID | GROUP NAME | BELONGING STUDENT ID | LEVEL | ... |
|---|---|---|---|---|
| G601 | PROFICIENCY GROUP (GRADE 6) | ... | 1 | ... |
| G602 | ADVANCED GROUP (GRADE 6) | ... | 2 | ... |
| G603 | INTERMEDIATE GROUP (GRADE 6) | ... | 3 | ... |
| G604 | ELEMENTARY GROUP (GRADE 6) | ... | 4 | ... |
| G501 | PROFICIENCY GROUP (GRADE 5) | ... | 5 | ... |
| ⋮ | ⋮ | ⋮ | ⋮ | ⋮ |

Fig.4

COMPETITIVE RELATIONSHIP INFORMATION

| STUDENT ID | NAME | COMPETITOR STUDENT ID | ... |
|---|---|---|---|
| S00001 | SUZUKI ICHIRO | S00002,S00004, ... | ... |
| S00002 | YAMADA JIRO | S00001, ... | ... |
| S00003 | YAMAMOTO HANAKO | ... | ... |
| S00004 | INOUE KAZUO | ... | ... |
| S00005 | TAKAHASHI RYOKO | ... | ... |
| ⋮ | ⋮ | ⋮ | ⋮ |

Fig.9

TEST PROGRESS INFORMATION (TEST X)

| STUDENT ID | NAME | GRADE | CLASS | Q 1 | Q 2 | ... | Q 8 | STATUS | SCORING RESULT |
|---|---|---|---|---|---|---|---|---|---|
| S00001 | SUZUKI ICHIRO | GRADE 6 | 6A | | | ... | | BEFORE START | |
| S00002 | YAMADA JIRO | GRADE 6 | 6B | | | ... | | BEFORE START | |
| S00004 | INOUE KAZUO | GRADE 6 | 6A | | | ... | | BEFORE START | |
| ⋮ | ⋮ | ⋮ | ⋮ | | | ⋮ | | ⋮ | |

Fig.10

TEST PROGRESS INFORMATION (TEST X)

| STUDENT ID | NAME | GRADE | CLASS | Q 1 | Q 2 | ... | Q 8 | STATUS | SCORING RESULT |
|---|---|---|---|---|---|---|---|---|---|
| S00001 | SUZUKI ICHIRO | GRADE 6 | 6A | 4, ☆ | 19, ☆ | ⋮ | | UNDER EXAMINATION | |
| S00002 | YAMADA JIRO | GRADE 6 | 6B | 4, ☆ | 17, △ | ⋮ | | UNDER EXAMINATION | |
| S00004 | INOUE KAZUO | GRADE 6 | 6A | 4, ☆ | 19, ☆ | ⋮ | | UNDER EXAMINATION | |
| .... | .... | .... | .... | .... | .... | .... | .... | .... | |

TEST PROGRESS INFORMATION (TEST X)

| STUDENT ID | NAME | GRADE | CLASS | Q1 | Q2 | ... | Q8 | STATUS | SCORING RESULT |
|---|---|---|---|---|---|---|---|---|---|
| S00001 | SUZUKI ICHIRO | GRADE 6 | 6A | 4、☆ | 19、☆ | ... | 62、△ | COMPLETION | 100／100 |
| S00002 | YAMADA JIRO | GRADE 6 | 6B | 4、☆ | 17、△ | ... | 57、○ | COMPLETION | 70／100 |
| S00004 | INOUE KAZUO | GRADE 6 | 6A | 4、☆ | 19、☆ | ... | 71、× | COMPLETION | 85／100 |
| ⋮ | ⋮ | ⋮ | ⋮ | ⋮ | ⋮ | ⋮ | ⋮ | ⋮ | ⋮ |

Fig.16

TEST PROGRESS INFORMATION (TEST X)

| STUDENT ID | NAME | GRADE | CLASS | Q 1 | Q 2 | ... | Q 8 | STATUS | SCORING RESULT |
|---|---|---|---|---|---|---|---|---|---|
| S00001 | SUZUKI ICHIRO | GRADE 6 | 6A | | | ... | | BEFORE START | |
| S00002 | YAMADA JIRO | GRADE 6 | 6B | | | ... | | BEFORE START | |
| S00004 | INOUE KAZUO | GRADE 6 | 6A | | | ... | | BEFORE START | |
| ⋮ | ⋮ | ⋮ | ⋮ | | | ⋮ | | ⋮ | |

Fig.17

TEST PROGRESS INFORMATION (TEST X)

| STUDENT ID | NAME | GRADE | CLASS | Q 1 | Q 2 | ... | Q 8 | STATUS | SCORING RESULT |
|---|---|---|---|---|---|---|---|---|---|
| S00001 | SUZUKI ICHIRO | GRADE 6 | 6A | 4, ☆, CORRECT | 19, ☆, CORRECT | ... | | UNDER EXAMINATION | |
| S00002 | YAMADA JIRO | GRADE 6 | 6B | 4, ☆, CORRECT | 17, △, INCORRECT | ... | | UNDER EXAMINATION | |
| S00004 | INOUE KAZUO | GRADE 6 | 6A | 4, ☆, CORRECT | 19, ☆, CORRECT | ... | | UNDER EXAMINATION | |
| .... | .... | .... | .... | .... | .... | .... | .... | .... | |

Fig.19

TEST PROGRESS INFORMATION (TEST X)

| STUDENT ID | NAME | GRADE | CLASS | Q 1 | Q 2 | ... | Q 8 | ... | STATUS | SCORING RESULT |
|---|---|---|---|---|---|---|---|---|---|---|
| S00001 | SUZUKI ICHIRO | GRADE 6 | 6A | 4, ☆, CORRECT | 19, ☆, CORRECT | ... | 62, △, CORRECT | ... | COMPLETION | 100/100 |
| S00002 | YAMADA JIRO | GRADE 6 | 6B | 4, ☆, CORRECT | 17, △, INCORRECT | ... | 57, ○, INCORRECT | ... | COMPLETION | 70/100 |
| S00004 | INOUE KAZUO | GRADE 6 | 6A | 4, ☆, CORRECT | 19, ☆, CORRECT | ... | 71, ×, INCORRECT | ... | COMPLETION | 85/100 |
| ... | ... | ... | ... | ... | ... | ... | ... | ... | ... | ... |

Fig.21

LEVEL DETERMINATION TABLE

| POINT CALCULATION RULE | POINTS = (TIME POINT) + (CORRECT ANSWER PERCENTAGE/2) |
|---|---|
| ACADEMIC LEVEL | POINT |
| LEVEL 1 | 81~100 |
| LEVEL 2 | 61~80 |
| LEVEL 3 | 41~60 |
| LEVEL 4 | 0~40 |

Fig.22

TIME POINT DETERMINATION TABLE
(TEST TIME; 20 MINUTES)

| TIME POINT | ANSWERING TIME |
|---|---|
| 50 POINTS | LESS THAN 10 MINUTES |
| 40 POINTS | 10 MINUTES TO LESS THAN 15 MINUTES |
| 35 POINTS | 15 MINUTES TO LESS THAN 16 MINUTES |
| 30 POINTS | 16 MINUTES TO LESS THAN 17 MINUTES |
| 25 POINTS | 17 MINUTES TO LESS THAN 18 MINUTES |
| 20 POINTS | 18 MINUTES TO LESS THAN 19 MINUTES |
| 15 POINTS | 19 MINUTES TO LESS THAN 20 MINUTES |
| 10 POINTS | 20 MINUTES |

LEARNING ASSISTANCE SERVER, LEARNING ASSISTANCE SYSTEM, AND LEARNING ASSISTANCE PROGRAM

RELATED APPLICATIONS

The present application is National Phase of International Application No. PCT/JP2012/007486 filed Nov. 21, 2012, and claims priority from Japanese Application No. 2012-001419, filed Jan. 6, 2012.

TECHNICAL FIELD

The present invention relates to a technique to provide test question information indicating a test question through a communication network to a student terminal used by a student.

BACKGROUND ART

A learning assistance system that distributes data used for learning using a communication network such as the Internet in order to assist student learning has conventionally been proposed (e.g., see Patent Literature 1).

Patent Literature 1 describes that a student and a teacher exchange the data including educational materials or answers through a communication network in a conversation form on a screen on the Internet in order to assist the student learning.

CITATION LIST

Patent Literature

Patent Literature 1: JP 2001-296788 A

SUMMARY OF INVENTION

Technical Problem

However, the learning effect is not taken into consideration in the conventional learning assistance system although the convenience on both sides of the teacher and the student is increased by the exchange of the data including educational materials through a communication network.

A new technique capable of assisting student learning to enhance the learning effect is required while various learning methods have been proposed and implemented in these years.

To solve the problem, an objective of the present invention is to provide a learning assistance technique capable of increasing motivation for learning and enhancing the learning effect.

Solution to Problem

The present invention is aimed to accomplish the objective with the configuration described in claims. The learning assistance server according to the present invention provides test question information indicating a test question to a student terminal used by a student through a communication network, and includes: a test associated information storage unit that stores test associated information including the test question information, test screen information indicating a test screen including a question display area that displays the test question and an answer input area on which an answer is to be input, and test progress information indicating progress of each student on the test; a competitive relationship information storage unit that stores competitive relationship information in which a student is linked to a competitor student indicating a student regarded as a competitor of the student; a test information transmission unit that transmits test information including the test question information and the test screen information to the student terminal; an answer information reception unit that receives, for each question, the answer information indicating the answer to each question in the test questions input to the answer input area on the test screen indicated in the test screen information; a test progress information update unit that updates the test progress information by registering the answer indicated in the answer information received with the answer information reception unit in the test progress information about an appropriate student; a competitor determination unit that determines with reference to the competitive relationship information whether the student whose test progress information has been updated is linked as a competitor student; a competitor progress information generation unit that, when the competitor determination unit determines that the student is linked as a competitor student, generates competitor progress information based on the test progress information about the competitor student; and a competitor progress information transmission unit that transmits the competitor progress information generated with the competitor progress information generation unit to the student terminal of the student to whom the competitor student is linked in order to display the progress in a competitor progress display area that is provided on the test screen and that displays the progress of the competitor student indicated in the competitor progress information.

The configuration can increase motivation for learning and thus can provide a learning assistance technique capable of enhancing the learning effect.

The competitor progress information preferably includes answered question information indicating a question that the competitor student has answered among the test questions.

The learning assistance server can have the configuration in which the test screen is provided with a confidence degree selection area on which a confidence degree about the answer input to the answer input area is selected, the answer information reception unit receives the answer information and confidence degree information indicating the confidence degree about the answer indicated in the answer information selected in the confidence degree selection area, the test progress information update unit updates the test progress information by registering the answer indicated in the answer information received with the answer information reception unit and the confidence degree indicated in the confidence degree information in the test progress information about an appropriate student, and the competitor progress information transmission unit generates and transmits the competitor progress information including the answered question information and the confidence degree information.

The learning assistance server can further include a group information storage unit that stores group information in which a plurality of groups that have been predetermined according to an academic level separately from a class to which each student belongs is linked to each student who belongs to each of the groups, and the test information transmission unit can transmit the test information including the test question information indicating different test questions for each group with reference to the group information.

The learning assistance server can further include a completion determination unit that determines whether a test is over; an academic level determination unit that, when the completion determination unit determines that the test is over, determines an academic level of each student based on answering result information indicating an answering result of each student; and a group information update unit that updates the group information by reorganizing the group to which each student belongs according to the academic level determined with the academic level determination unit.

The learning assistance server can have the configuration in which the answering result information includes correct answer percentage information indicating a percentage of correct answers of each question and answering time information indicating a time for answering on a test, and the academic level determination unit determines the academic level of each student with reference to a level determination table in which a relationship between the correct answer percentage and the answering time, and the academic level has been predetermined.

The test information transmission unit can sequentially transmit the test information at predetermined time intervals to a plurality of student terminals.

The learning assistance system according to the present invention includes a student terminal used by a student, and a learning assistance server that provides test question information indicating a test question to the student terminal through a communication network. The learning assistance server includes a test associated information storage unit that stores test associated information including the test question information, test screen information indicating a test screen including a question display area that displays the test question and an answer input area on which an answer is to be input, and test progress information indicating progress of each student on the test; a competitive relationship information storage unit that stores competitive relationship information in which a student is linked to a competitor student indicating a student regarded as a competitor of the student; a test information transmission unit that transmits test information including the test question information and the test screen information to the student terminal; an answer information reception unit that receives, for each question, the answer information indicating the answer to each question in the test questions input to the answer input area on the test screen indicated in the test screen information; a test progress information update unit that updates the test progress information by registering the answer indicated in the answer information received with the answer information reception unit in the test progress information about an appropriate student; a competitor determination unit that determines with reference to the competitive relationship information whether the student whose test progress information has been updated is linked as a competitor student; a competitor progress information generation unit that, when the competitor determination unit determines that the student is linked as a competitor student, generates competitor progress information based on the test progress information about the competitor student; and a competitor progress information transmission unit that transmits the competitor progress information generated with the competitor progress information generation unit to the student terminal of the student to whom the competitor student is linked. The student terminal includes: a test screen display unit that displays the test screen; an answer input reception unit that receives an input of an answer to an answer input area on the test screen; and an answer transmission unit that transmits answer information indicating the answer received with the answer input reception unit at each question. The test screen display unit displays progress of a competitor student indicated in the received competitor progress information in a competitor progress display area that is provided on the test screen and that displays the progress of the competitor student when receiving the competitor progress information.

The learning assistance program according to the present invention causes a learning assistance server that provides test question information indicating a test question to a student terminal used by a student through a communication network to perform a learning assistance process. The learning assistance server including: a test associated information storage unit that stores test associated information including the test question information, test screen information indicating a test screen including a question display area that displays the test question and an answer input area on which an answer is to be input, and test progress information indicating progress of each student on the test; and a competitive relationship information storage unit that stores competitive relationship information in which a student is linked to a competitor student indicating a student regarded as a competitor of the student. The learning assistance process includes: a test information transmission process for transmitting test information including the test question information and the test screen information to the student terminal; an answer information reception process for receiving, for each question, the answer information indicating the answer to each question in the test questions input to the answer input area on the test screen indicated in the test screen information; a test progress information update process for updating the test progress information by registering the answer indicated in the answer information received in the answer information reception process in the test progress information about an appropriate student; a competitor determination process for determining with reference to the competitive relationship information whether the student whose test progress information has been updated is linked as a competitor student; a competitor progress information generation process for generating competitor progress information based on the test progress information about the competitor student when it is determined in the competitor determination process that the student is linked as a competitor student; and a competitor progress information transmission process for transmitting the competitor progress information generated in the competitor progress information generation process to the student terminal of the student to whom the competitor student is linked in order to display the progress in a competitor progress display area that is provided on the test screen and that displays the progress of the competitor student indicated in the competitor progress information.

Advantageous Effects of Invention

The present invention can increase motivation for learning and thus can provide a learning assistance technique capable of enhancing the learning effect.

BRIEF DESCRIPTION OF DRAWINGS

FIG. 2 is an explanatory diagram of exemplary student information.

FIG. 3 is an explanatory diagram of exemplary group information.

FIG. 4 is an explanatory diagram of exemplary competitive relationship information.

FIG. 9 is an explanatory diagram of exemplary test progress information.

FIG. 10 is an explanatory diagram of an example of the test progress information updated based on answer information.

FIG. 16 is an explanatory diagram of another exemplary test progress information.

FIG. 17 is an explanatory diagram of another example of the test progress information updated based on answer information.

FIG. 19 is an explanatory diagram of another example of the test progress information updated based on the scoring results.

FIG. 21 is an explanatory diagram of an exemplary level determination table.

FIG. 22 is an explanatory diagram of an exemplary time point determination table.

DESCRIPTION OF EMBODIMENTS

Hereinafter, a preferred embodiment for implementing the present invention will be described using the drawings. Note that the present invention according to each claim is not limited to the embodiment. Furthermore, the means for solving the problem in the present invention do not necessarily require all of the combinations of the characteristics described in the embodiment.

Figure 1:
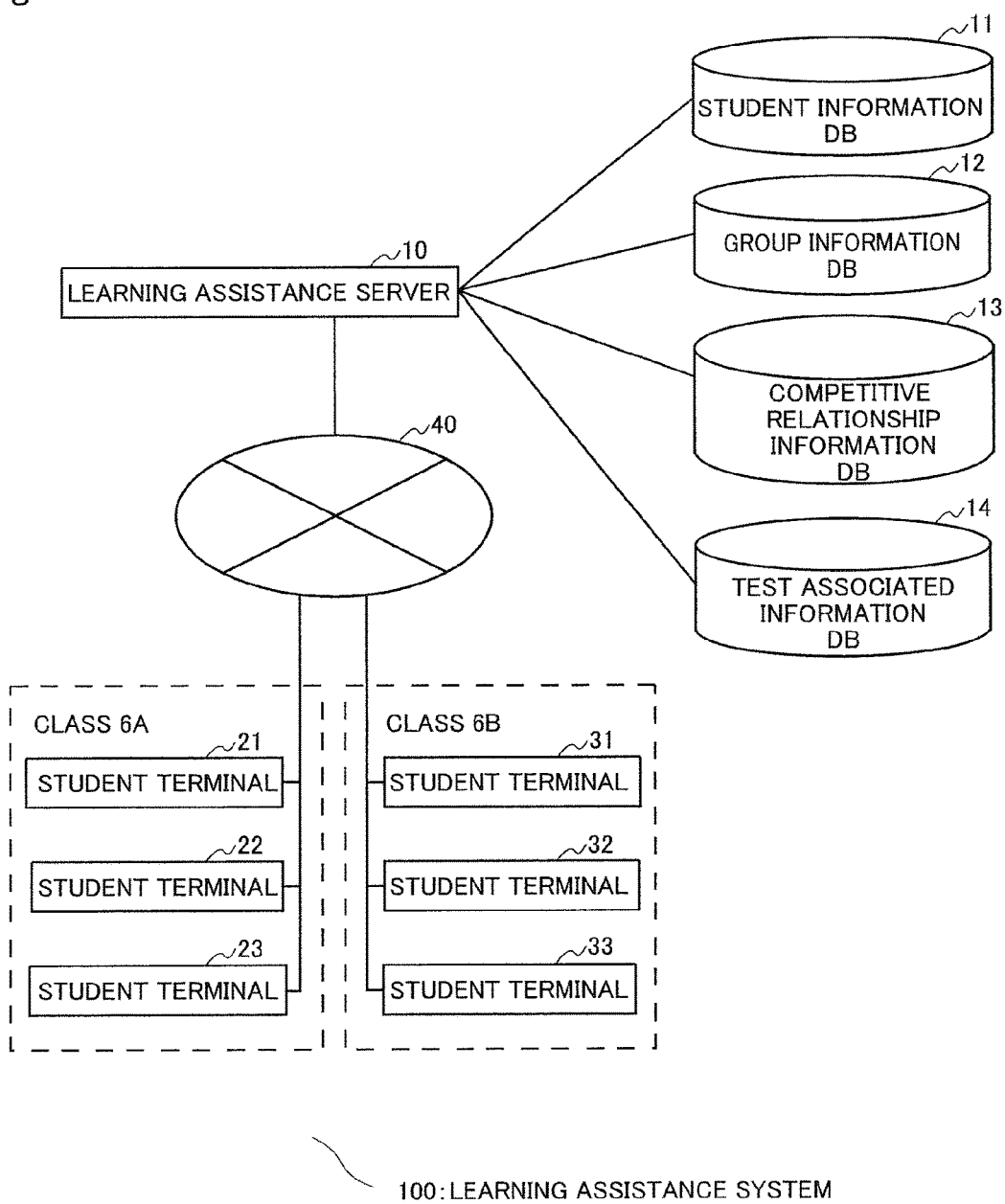
FIG. 1 is a block diagram of an exemplary configuration of a learning assistance system 100 according to an embodiment of the present invention.

FIG. 1 is a block diagram of an exemplary configuration of a learning assistance system 100 according to an embodiment of the present invention. As illustrated in FIG. 1, the learning assistance system 100 includes a learning assistance server 10, and student terminals 21 to 23 and 31 to 33. The learning assistance server 10 and the student terminals 21 to 23 and 31 to 33 are connected to each other through a communication network 40 such as the Internet. The learning assistance server 10 and the student terminals 21 to 23 and 31 to 33 communicate with each other, for example, in a communication system by polling.

The learning assistance server 10 is managed, for example, by the system administrator of the present system 100, and includes an information processing apparatus, for example, the WWW server. The learning assistance server 10 has various functions such as a function for providing various types of information for assisting the student learning to the student terminals 21 to 23 and 31 to 33 used by the registered users, and a function for collecting various types of information including the answers of test questions from the student terminals 21 to 23 and 31 to 33.

The learning assistance server 10 includes a student information DB 11 that stores the student information indicating the information about a student who is a registered user, a group information DB 12 that stores the group information indicating the information about the groups determined on the system administrator side, a competitive relationship information DB 13 that stores the competitive relationship information indicating the competitive relationships among the students, and a test associated information DB 14 that stores the test associated information indicating the information about a test including a test (examination) questions and the answers. Each of the student information DB 11, the group information DB 12, the competitive relationship information DB 13, and the test associated information DB 14 can be included inside or outside the learning assistance server 10.

Each of the student terminals 21 to 23 and 31 to 33 is managed by the registered user of the present system 100, and includes an information processing apparatus, for example, a mobile phone terminal or a personal computer. Note that a terminal managed by the system administrator of the present system can be lent to a student who is the user.

In the example illustrated in FIG. 1, the student terminals 21 to 23 are used in the classroom of a class 6A and the student terminals 31 to 33 are used in the classroom of a class 6B. In other words, the student terminals 21 to 23 and 31 to 33 are used by the students in a classroom of a school, a tutoring school or the like in the present embodiment. Note that the number of the student terminals used in each class is not limited. Furthermore, the number of classes is also not limited.

FIG. 2 is an explanatory diagram of exemplary student information stored in the student information DB 11. The student information includes various types of information about a student who is a user of the present system 100 and belongs to a school or tutoring school that is the system administrator of the present system. Specifically, the student information includes information about a student ID for uniquely specifying the student, the student name, the address, the contact number, the grade, the class to which the student belongs, and the academic results.

FIG. 3 is an explanatory diagram of exemplary group information stored in the group information DB 12. The group information indicates which group each student belongs to among the gropes divided according to the arrangement in a school or tutoring school that is the system administrator of the present system. Specifically, the group information includes information about a group ID for uniquely specifying the group, the group name, the student ID of the student who belongs to the group, and the level of each student determined according to a predetermined rule.

A "group" is includes a plurality of students determined as suitable to study together, for example, according to academic abilities or their preferred schools. The group to which each student belongs has been determined by the school or the tutoring school in advance. Note that, a "class" includes a plurality of students using the same classroom in the present embodiment. The "group" includes a plurality of students divided according to the academic level regardless of the "class" to which each student belongs in the present embodiment.

FIG. 4 is an explanatory diagram of exemplary competitive relationship information stored in the competitive relationship information DB 13. The competitive relationship information links each student to a student having a competitive relationship with the student. Specifically, the competitive relationship information includes the student ID of each student, the student name, and the student ID of the competitor student of the student (competitor student ID). Various method such as a method in which a competitor student of each student is determined on the school or tutoring school side, a method in which each student designates the competitor student to register the competitor student, and a method in which the competitor is determined according to a test for determining the competitor can be considered as a method to determine a competitor student of each student. Furthermore, a student or a plurality of students can be the competitor. The number of competitors can be limited, for example, up to ten. Even when a first student is registered as the competitor of a second student, the second student is not necessarily registered as the competitor of the first student.

While not illustrated in the drawings, the test information stored in the test associated information DB 14 includes various types of information such as the information about the questions in a test (test question information), the information about the test screen for conducting a test (test screen information), and the information about the answers to the test (test answer information).

Next, the operation of the learning assistance system 100 in the present example will be described. Note that the detailed descriptions of processes that do not especially relate to the present invention are sometimes omitted.

Figure 5:
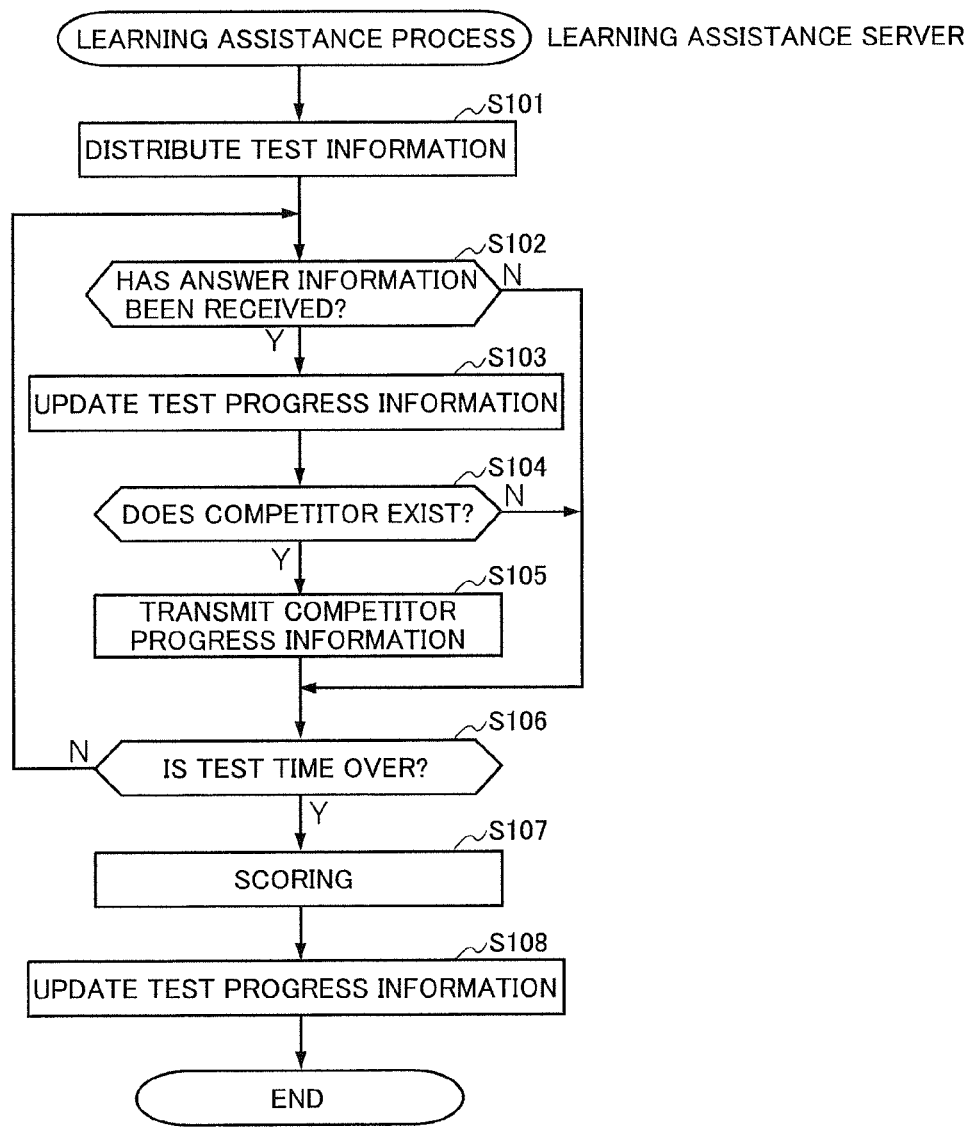
FIG. 5 is a flowchart describing an exemplary learning assistance process performed with a learning assistance server.

FIG. 5 is a flowchart describing an exemplary learning assistance process performed with the learning assistance server 10 in the learning assistance system 100. In the learning assistance process performed with the learning assistance server 10 (hereinafter, sometimes referred to as a "test screen providing process" for distinguishing it from the learning assistance process performed with each of the student terminals 21 to 23 and 31 to 33), a process for providing the test information to the student terminals 21 to 23 and 31 to 33 and scoring the answers indicated in the answer information received from the student terminals 21 to 23 and 31 to 33 is performed.

Figure 6:
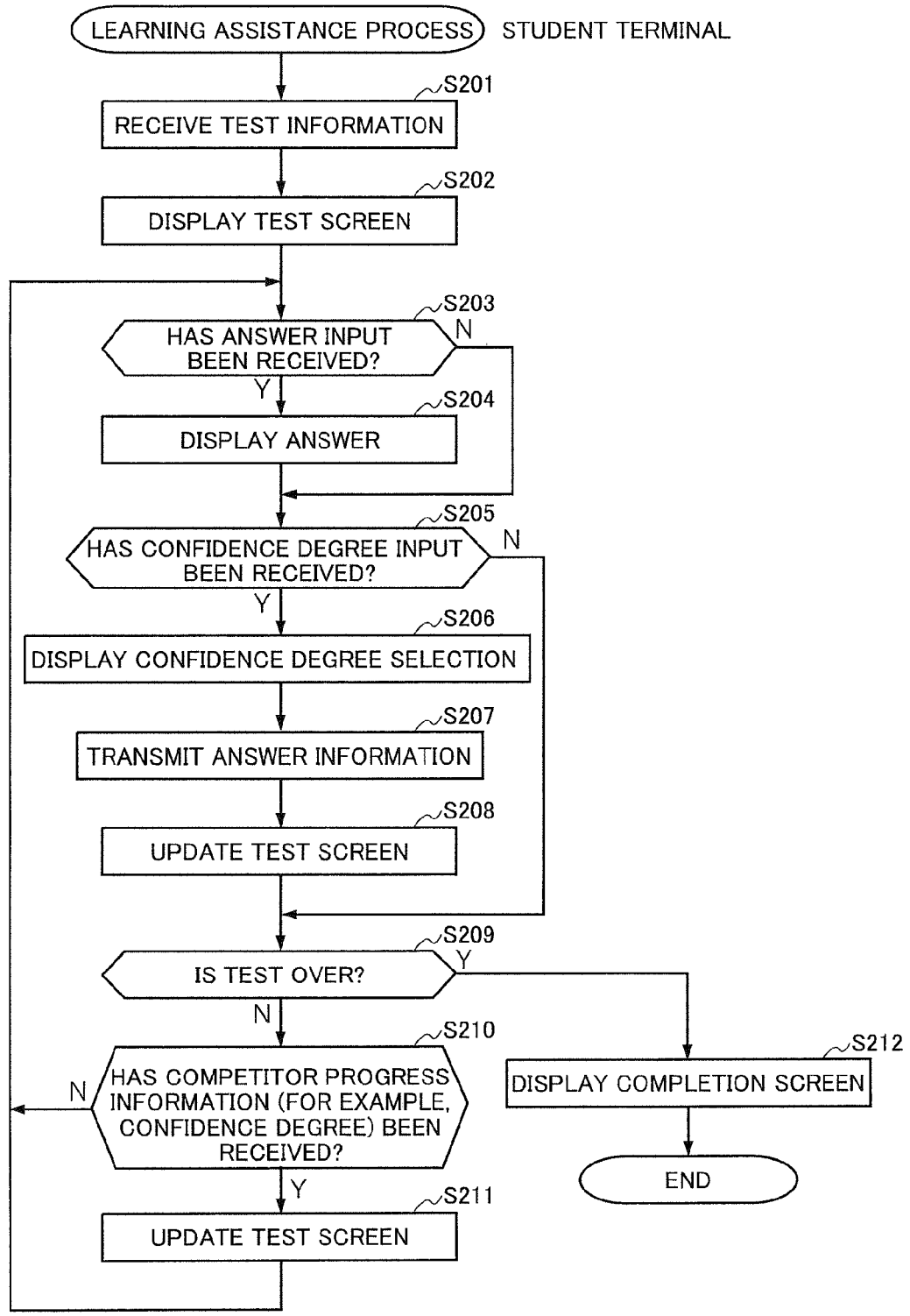
FIG. 6 is a flowchart describing an exemplary learning assistance process performed with each student terminal.

FIG. 6 is a flowchart describing an exemplary learning assistance process performed with each of the student terminals 21 to 23 and 31 to 33 in the learning assistance system 100. In the learning assistance process performed with each of the student terminals 21 to 23 and 31 to 33 (hereinafter, sometimes referred to as a "test conducting process" for distinguishing it from the learning assistance process performed with the learning assistance server 10), a process for displaying the test screen and receiving the answer to the question displayed on the test screen from the user. Hereinafter, a student terminal 21 operated by a user S that is a registered user will be described as an example.

The test screen providing process in the present example is started in response to the operation by a system administrator A. The test conducting process in the present example is started, for example, in response to the fact that the student terminal 21 determines that the student terminal 21 has received a test information reception request according to the user S operation.

After starting the test screen providing process, the learning assistance server 10 distributes the test information stored in the test associated information DB 14 to a distribution destination (step S101). Note that, as for the distribution of the test information, the learning assistance server 10 can distributes the test information to a plurality of distribution destinations at the same time (simultaneous distribution) or can separately (at a separate timing) distribute the test information to a distribution destination from which a distribution request has been received (separate distribution). Hereinafter, an example in which test information about a test X is distributed to distribution destinations including the student terminal 21 will be described.

When receiving the test information distributed with the learning assistance server 10 (step S201) after the start of the test conducting process, the student terminal 21 displays the test screen corresponding to the received test information on a display screen of a display device included in the student terminal 21 (step S202). Note that the information for displaying the test screen on the display screen (the test screen information) is stored as apart of the test information in the test associated information DB 14.

Figure 7:
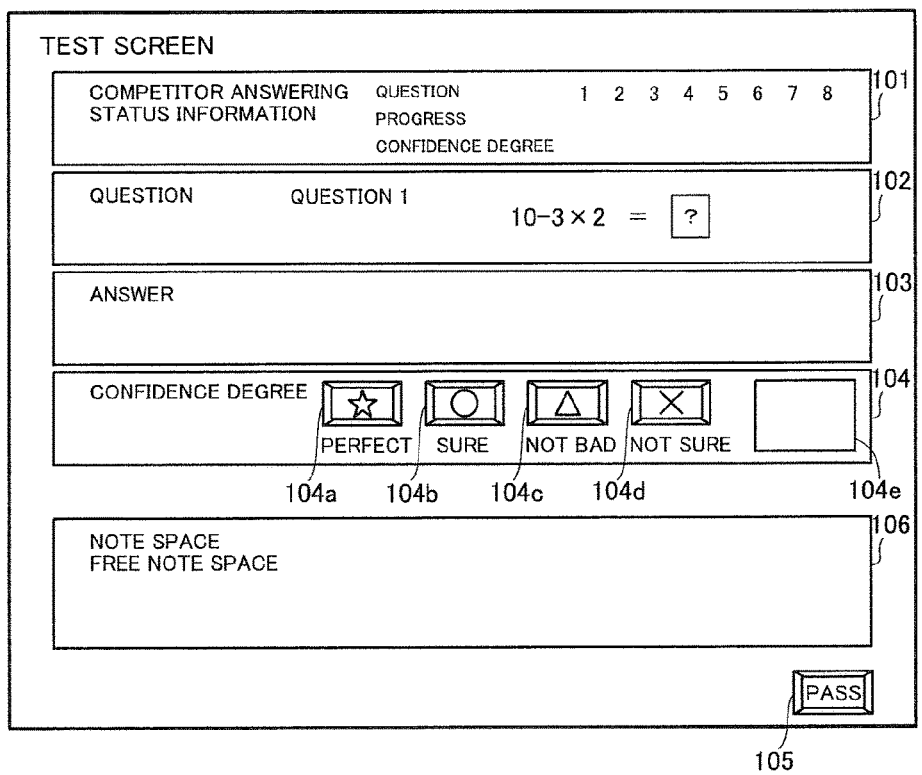
FIG. 7 is an explanatory diagram of an exemplary test screen.

FIG. 7 is an explanatory diagram of an exemplary test screen. As illustrated in FIG. 7, the test screen in the present example is provided with a competitor progress display area 101 that displays the progress of the competitor student indicated in the competitor progress information, a question display area 102 that displays a question, an answer input area 103, a confidence degree button display area 104, a pass button 105 that receives the operation for omitting the input of the answer to the question (pass operation), and a note space display area 106 that displays a note space (free note space) that the user S can use as a note space. Note that the formation of the test screen is not limited to the example. For example, the test screen is preferably provided with various buttons considered as necessary for a test such as a button that receives the operation for displaying the answered question again or an area that displays the information (for example, the remaining time on the test).

In that case, the competitor progress information indicates the progress (namely, the answering status) of the user who is a competitor of the user S on the test in the competitive relationship information (see FIG. 4). As illustrated in FIG. 7, the question number, the progress, and the confidence degree are displayed as the competitor progress information on the competitor progress display area 101. Note that, specifically, a check mark indicating that the competitor has answered the question and a mark indicating the confidence degree are displayed below the number indicating the question number. Note that the competitor progress information will be described in detail below.

The answer input area 103 is an area on which the user S inputs an answer, for example, with a stylus pen. Note that the method for receiving an input is not especially limited. Various methods such as a button operation and a voice input can be adopted. However, the input receiving method is preferably with a high learning effect for the user S. An input receiving method in which a handwriting input can be received is preferably adopted because the handwriting is considered as a method in that the user can answer as if taking a general test. The display screen section includes a touch panel in the present example. The student terminal 21 has a handwritten character recognition function for recognizing the answer input by the user S with a stylus pen or the like in the answer input area 103 and converting the answer into electronic data.

The confidence degree button display area 104 is an area on which the confidence degree button for receiving the input of the "confidence degree" of the user S is displayed. In that case, the "confidence degree" indicates the degree of confidence of the respondent to the answer. The user who is the respondent arbitrarily selects the confidence degree for each question in the example. As illustrated in FIG. 7, selectable four confidence buttons 104a, 104b, 104c, and 104d indicating different confidence degrees are displayed on the confidence degree button display area 104. Note that, although an example in which four confidence degrees "perfect," "sure," "not bad," and "not sure" are represented with different symbols will be described in the present example, the expression of the confidence degree is not especially limited. For example, ten-level confidence degrees can be represented with numerical values. An example in which the student terminal 21 starts a process for displaying the next question in response to the fact that a confidence degree has been selected will be described in the present example. Note that, in addition to the confidence degree buttons, a button for receiving an answering completion operation (in other words, for receiving an operation for displaying the next question) (completion button) can be provided on the test screen.

The note space display area 106 is an area on which the user S inputs a memo, for example, with a stylus pen and an area on which the memo input by the user S is displayed. Note that the input receiving method is not especially limited. The memo input in the note space can be linked to the question that has been displayed on the question display area 102 at the input of the memo. The display of the memo input in the note space can be maintained regardless of the change of the question.

After the test screen has been displayed, the student terminal 21 receives the input of the answer (step S203). When determining that an answer has been input from the reception of the operation on the answer input area 103 (Y in step S203), the student terminal 21 displays the input and received answer on the answer input area 103 (step S204).

After displaying the entered and received answer, the student terminal 21 receives the input of the confidence degree (step S205). In that case, when determining that the student terminal 21 has not received the input of the confidence degree, for example, from the reception of the press of the pass button 105 (N in step S205), the student terminal 21 goes to the process in step S209 to be described below.

On the other hand, when determining that the student terminal 21 has received the input of the confidence degree from the reception of the press of one of the four confidence degree buttons 104 (Y in step S205), the student terminal 21 displays the input and received confidence degree on a confidence degree display area 104e provided in the confidence degree button display area 104 (step S206). Note that the method for displaying a selected confidence degree (method for displaying a confidence degree selection) is not limited the example. For example, in response to the reception of the operation for selecting the confidence degree button 104a by the user S, the student terminal 21 can display the confidence degree button 104a in such a way as to make the confidence degree button 104a identifiable from the other confidence degree buttons 104b, 104c, and 104d.

Figure 8:
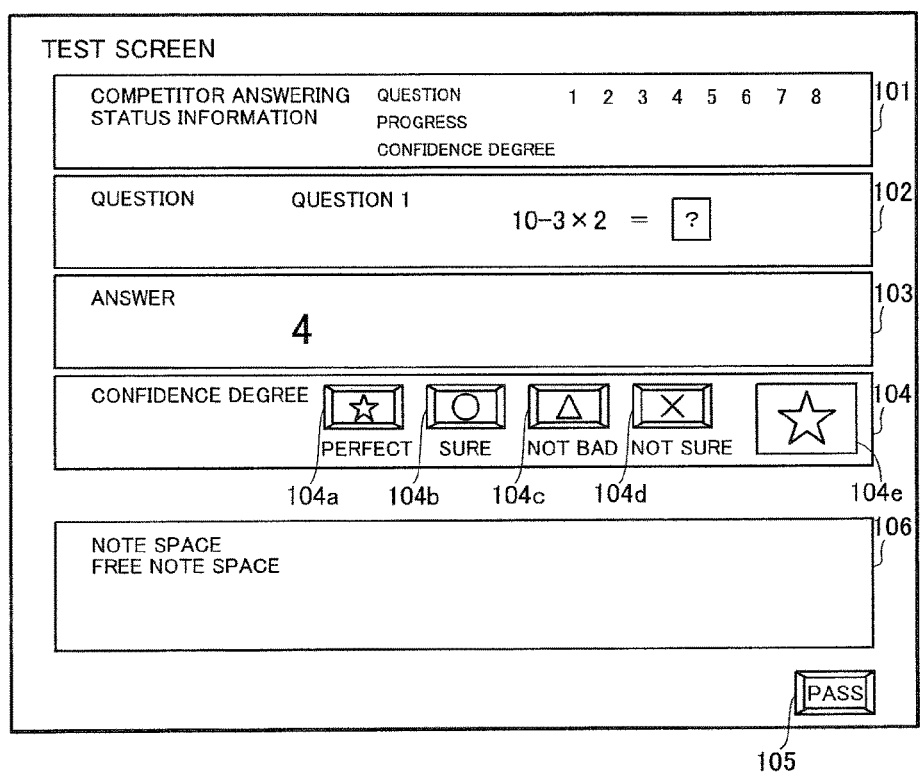
FIG. 8 is an explanatory diagram of an exemplary test screen displaying an answer and a confidence degree.

FIG. 8 is an explanatory diagram of an exemplary test screen displaying an answer and a confidence degree. As illustrated in FIG. 8, the answer and confidence degree of which inputs the student terminal 21 has received are displayed on the answer input area 103 and the confidence degree display area 104e, respectively.

After displaying the confidence degree, the student terminal 21 transmits the answer information to the learning assistance server 10 (step S207). At that time, the student terminal 21 transmits the student ID of the user S, the identification information about the question, and the answer information as the answer information to the learning assistance server 10 in the present example. The identification information about the question has been displayed on the question display area 102 and the answer information has been displayed on the answer input area 103 when it has been determined that the answering has been completed. Note that the student terminal 21 also transmits the confidence degree information to the learning assistance server 10 in the present example. The confidence degree information indicates the confidence degree that has been displayed on the confidence degree display area 104e when it has been determined that the answering has been completed (in other words, the confidence degree about the answer indicated in the answer information).

After transmitting the answer information and the confidence degree information, the student terminal 21 updates the test screen based on the test information (step S208). If there is a next question, the student terminal 21 displays the test screen showing the next question on the display screen in the present example. If there is not a next question, the student terminal 21 determines that the test is over (Y in step S209), and displays the completion screen that is indicated in the test information (or has been predetermined) on the display screen (step S212) to complete the process.

On the other hand, when determining that the test is not over (N in step S209), the student terminal 21 determines whether the student terminal 21 has received the competitor progress information from the learning assistance server 10 (step S210). Hereinafter, the competitor progress information will be described together with the description of the operation of the learning assistance server 10 after the distribution of the test information.

The learning assistance server 10 determines whether the learning assistance server 10 has received the answer information from the distribution destination after the distribution of the test information (step S102). When determining that the learning assistance server 10 has not received the answer information from the distribution destination (N in step S102), the learning assistance server 10 goes to the process in step S106 to be described below.

On the other hand, when determining that the learning assistance server 10 has received the answer information, for example, from the reception of the answer information transmitted from the student terminal 21 (Y in step S102), the learning assistance server 10 updates the test progress information based on the received information (step S103). The test progress information is stored at a predetermined storage region in the test associated information DB 14 in the present example. Note that the test progress information can be stored in another storage medium (not illustrated in the drawings).

FIG. 9 is an explanatory diagram of exemplary test progress information stored in the test associated information DB 14. The test progress information includes information about a student ID for uniquely specifying the student, the student name, the grade, the class, the question number, the status and the scoring results.

In that case, the "status" indicates the progress on the test, for example, includes "before the start," "under examination," and "examination completion."

When receiving the answer information transmitted from the distribution destination of the test information about the test X, the learning assistance server 10 updates the test progress information based on the received answer information.

FIG. 10 is an explanatory diagram of an example of the test progress information updated based on the answer information. As illustrated in FIG. 10, the learning assistance server 10 updates the test progress information by registering the answer and the confidence degree in the storage region linked to the student ID and question number indicated in the answer information.

After updating the test progress information, the learning assistance server 10 refers to the competitive relationship information to determine whether a competitor exists in each distribution destination of the test information about the test X (step S104). The learning assistance server 10 determines in the present example whether a user registering the user S as the competitor exists among the distribution destinations of the test information about the test X.

When determining that there is a student ID registering the student ID of the user S as the competitor student ID with reference to the competitive relationship information, the learning assistance server 10 determines that a competitor exists (Y in step S104) and generates the competitor progress information based on the test progress information to transmits the competitor progress information to the student terminal (the student terminal that the user registering the user S as the competitor uses and that is specified according to the student ID) (step S105). In the present example, the learning assistance server 10 generates the information indicating the number and confidence degree about the question that the user S has answered as the competitor progress information to transmit the competitor progress information to the user terminal used by the user registering the user S as the competitor.

After the competitor progress information has been transmitted to the user S by the processes in steps S102 to S105 in the learning assistance process performed with the learning assistance server 10, the student terminal 21 receives the competitor progress information (Y in step S210) and updates the test screen based on the received competitor progress information (step S211), and then goes to the process in step S203.

Figures 11, 12:
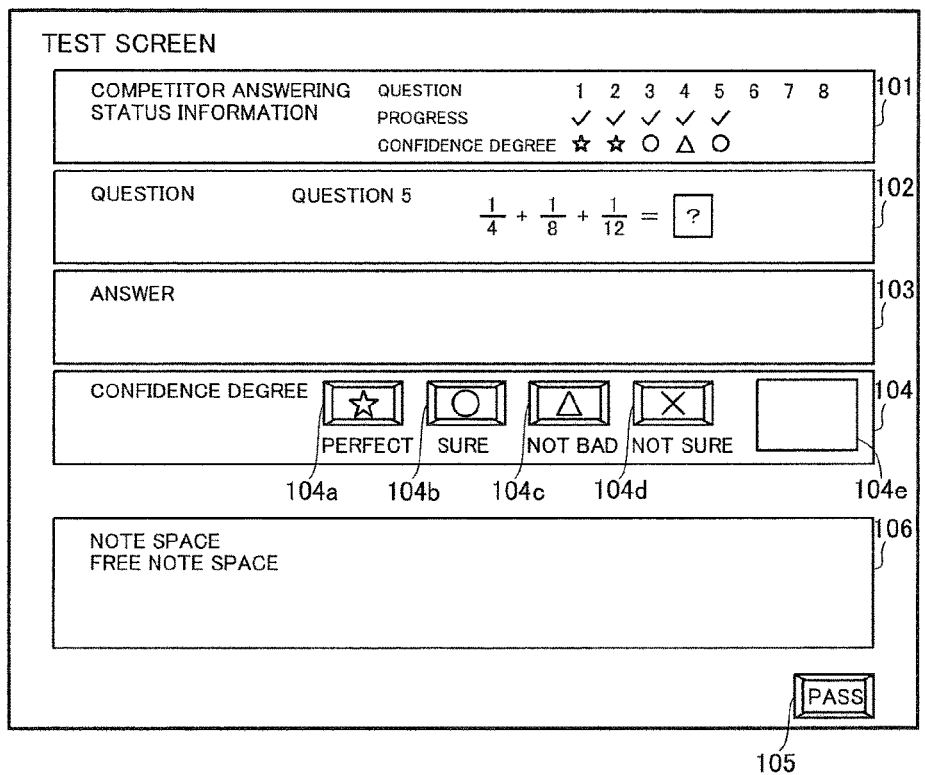
FIG. 11 is an explanatory diagram of an example of the test screen updated based on competitor progress information.
FIG. 12 is an explanatory diagram of an example of the test progress information updated based on the scoring results.

FIG. 11 is an explanatory diagram of an example of the test screen updated based on the competitor progress information. As illustrated in FIG. 11, a checkmark indicating the progress and a mark indicating the confidence degree selected by the competitor about each question are displayed on the competitor progress display area 101 in the test screen. Note that the form of the display of the competitor progress is not limited to the example. For example, the competitor progress information about a plurality of competitors can be displayed. Alternatively, the average values (the average of the progress and the average of the confidence degrees of each question) can be displayed. The average values are indicated in the answering situation information about a plurality of competitors.

On the other hand, after transmitting the competitor progress information, the learning assistance server 10 determines whether the test time is over (step S106). For example, when determining that the test time is not over (N in step S106) according to the fact that the time elapsed since the distribution of the test information does not reach the time set as the time for answering on the test X (hereinafter, referred to as a "test time"), the learning assistance server 10 goes to the process in step S102.

On the other hand, when determining that the test time is over according to the fact that the elapsed time has reached the test time of the test X (Y in step S106), the learning assistance server 10 scores the answer from each student indicated in the test progress information based on the test information stored in the test associated information DB 14 (step S107).

After scoring the answer, the learning assistance server 10 updates the test progress information based on the scoring results (step S108) and then completes the process.

FIG. 12 is an explanatory diagram of an example of the test progress information updated based on the scoring results. As illustrated in FIG. 12, the learning assistance server 10 updates the test progress information by registering the scoring results (points) of the answer by each student and registering "completion" as the status.

Note that, although the learning assistance server 10 generates the information indicating the number and confidence degree about the question that the user S has answered as the competitor progress information in the embodiment, the competitor progress information can have any structure from which the user can recognize the competitor progress. For example, the competitor progress information can have a structure in which the confidence degree is not handled as the competitor progress information.

Furthermore, although the test question information includes the test question in the embodiment, the test question can be stored in a storage medium included in each of the student terminals 21 to 23 and 31 to 33 in advance. The test question information can be a test question ID indicating the test question. The learning assistance server 10 can provide the test question ID as the test question information indicating the test question to the student terminals 21 to 23 and 31 to 33. Each of the student terminals 21 to 23 and 31 to 33 can read the test question linked to the received test question ID from the storage medium to display the test question.

As describe above, the learning assistance server 10 includes the test associated information DB 14 and the competitive relationship information DB 13 in the embodiment. The learning assistance server 10 provides the test question information indicating a test question to the student terminals 21 to 23 and 31 to 33 used by the students through the communication network 40. The test associated information DB 14 stores the test associated information (for example, the test information) including the test question information, the test screen information indicating the test screen including the question display area 102 that displays the test question and the answer input area 103 on which the answer is input, and the test progress information indicating the progress of each student on the test. The competitive relationship information DB 13 stores the competitive relationship information in which a student is linked to a competitor student indicating the student regarded as the competitor of the student. The learning assistance server 10 transmits the test information including the test question information and the test screen information to a student terminal (for example, the student terminal 21 used by the user S). The learning assistance server 10 receives, for each question, the answer information indicating the answer to each question in the test questions input to the answer input area 103 on the test screen indicated in the test screen information. The learning assistance server 10 updates the test progress information by registering the answer indicated in the received answer information in the test progress information about an appropriate student (for example, the user S). The learning assistance server 10 determines with reference to the competitive relationship information whether the student whose test progress information has been updated (for example, the user S) is linked as the competitor student. When determining that the student is linked as the competitor student, the learning assistance server 10 generates the competitor progress information based on the test progress information about the competitor student (for example, the user S). To display the progress on the competitor progress display area 101 that is provided on the test screen and that displays the progress of the competitor student indicated in the competitor progress information, the learning assistance server 10 transmits the generated competitor progress information to the student terminal of the student to whom the competitor student is linked. This can increase the motivation for learning and thus can provide a learning assistance technique that can enhance the learning effect.

In other words, the student can study with grasping the competitor progress. This can increase the student's motivation for learning.

Note that, although the test associated information is stored in the DB of the learning assistance server and each student terminal displays the test screen according to the test associated information distributed from the learning assistance server in the embodiment, the test associated information can be stored in a storage region included in each student terminal. In such a case, for example, the learning assistance server distributes the code (test code) indicating the test question to be conducted as the test associated information to each student terminal such that each of the student terminals that have received the test code can display the test screen on the display screen according to the received test code based on the test associated information stored in the storage region.

The competitor progress information includes the answered question information (for example, a question number) indicating the question that the competitor student has answered among the test questions in the embodiment. This can display a test screen from which the user can easily grasp the competitor progress.

The confidence degree selection area (for example, the confidence degree button display area 104) for selecting the confidence degree about the answer input in the answer input area is provided on the test screen in the embodiment. The learning assistance server 10 receives the received answer information and the confidence degree information indicating the confidence degree about the answer indicated in the answer information selected in the confidence degree selection area. The learning assistance server 10 updates the test progress information by registering the answer indicated in the received answer information and the confidence degree indicated in the confidence degree information in the test progress information about an appropriate student. The learning assistance server 10 generates and transmits the competitor progress information including the answered question information (for example, a question number) and the confidence degree information. This can provide the information efficient for increasing the student's motivation for learning. In other words, the student (the user of the student terminal) can grasp not only the competitor progress but also the student's awareness (the presence or absence of confidence) about the question. This can further increase the student's motivation for learning.

Once the learning assistance server 10 has distributed test information, the learning assistance server 10 does not newly distribute the test information until the test time according to the distributed test information is over in the embodiment. However, note that the method for distributing the test information is not limited to the embodiment. In other words, for example, the learning assistance server 10 can sequentially transmit the test information at predetermined time intervals (for example, five seconds) to a plurality of student terminals. This can reduce the communication load required to distribute the test information.

While the competitor progress can be recognized in the embodiment, the percentage of questions that the competitor has answered correctly can be recognized. Hereinafter, the operation of the learning assistance system 100 in which the percentage of questions that the competitor has answered correctly can be recognized will be described. Note that the detailed descriptions of processes that do not especially relate to the present invention are sometimes omitted.

Figure 13:
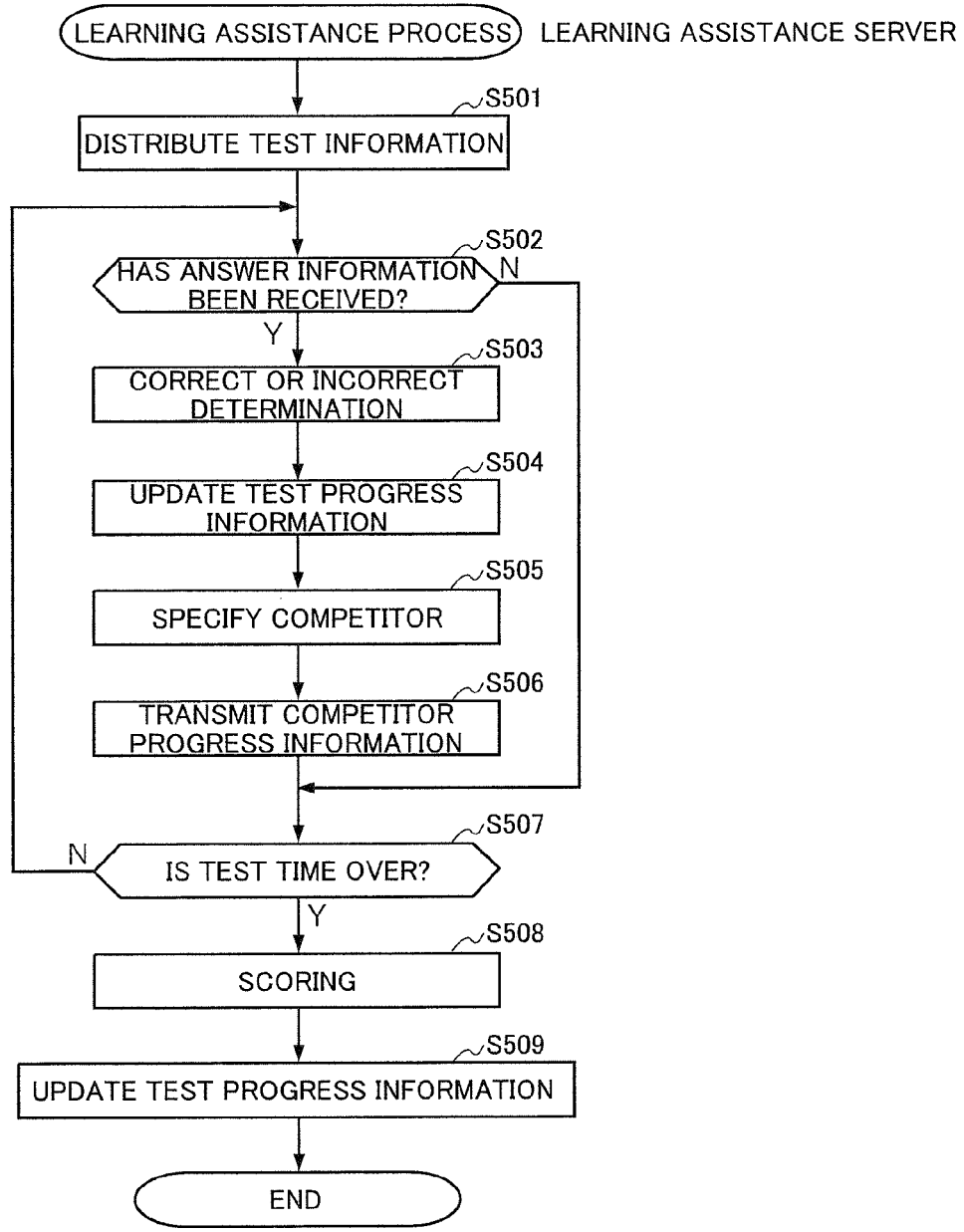
FIG. 13 is a flowchart describing another exemplary learning assistance process performed with the learning assistance server.

FIG. 13 is a flowchart describing another exemplary learning assistance process performed with the learning assistance server 10 in the learning assistance system 100. In the learning assistance process performed with the learning assistance server 10 (hereinafter, sometimes referred to as a "test screen providing process" for distinguishing it from the learning assistance process performed with each of the student terminals 21 to 23 and 31 to 33), a process for providing the test information to the student terminals 21 to 23 and 31 to 33 and scoring the answers indicated in the answer information received from the student terminals 21 to 23 and 31 to 33 is performed.

Figure 14:
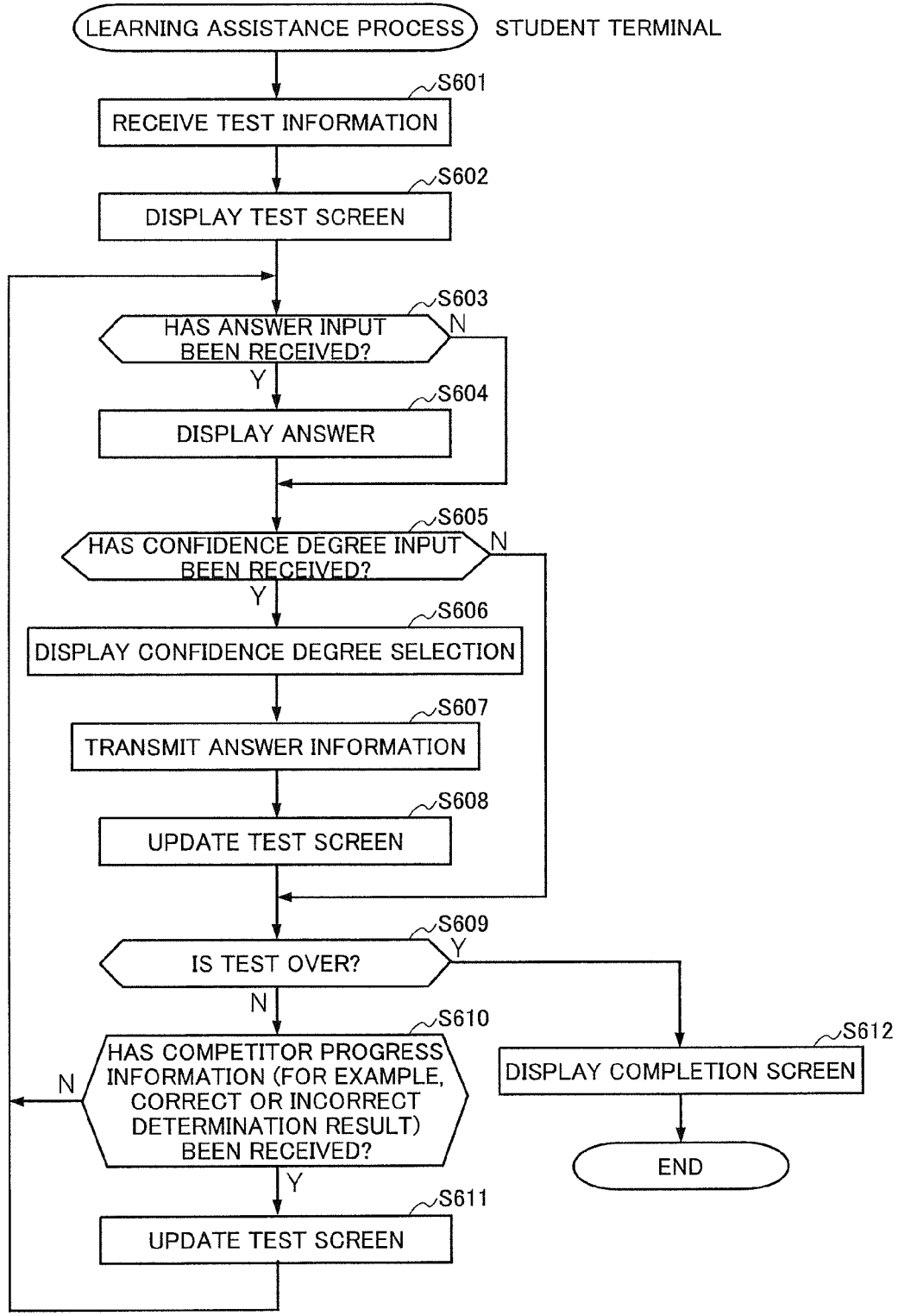
FIG. 14 is a flowchart describing another exemplary learning assistance process performed on each student terminal.

FIG. 14 is a flowchart describing another exemplary learning assistance process performed with each of the student terminals 21 to 23 and 31 to 33 in the learning assistance system 100. In the learning assistance process performed with each of the student terminals 21 to 23 and 31 to 33 (hereinafter, sometimes referred to as a "test conducting process" for distinguishing it from the learning assistance process performed with the learning assistance server 10), a process for displaying the test screen and receiving the answer to the question displayed on the test screen from the user. Hereinafter, a student terminal 21 operated by a user S that is a registered user will be described as an example.

The test screen providing process in the present example is started in response to the operation by a system administrator A. The test conducting process in the present example is started, for example, in response to the fact that the student terminal 21 determines that the student terminal 21 has received a test information reception request according to the user S operation.

After starting the test screen providing process, the learning assistance server 10 distributes the test information stored in the test associated information DB 14 to a distribution destination (step S501). Note that, as for the distribution of the test information, the learning assistance server 10 can distributes the test information to a plurality of distribution destinations at the same time (simultaneous distribution) or can separately (at a separate timing) distribute the test information to a distribution destination from which a distribution request has been received (separate distribution). Hereinafter, an example in which test information about a test X is distributed to distribution destinations including the student terminal 21 will be described.

When receiving the test information distributed with the learning assistance server 10 (step S601) after the start of the test conducting process, the student terminal 21 displays the test screen corresponding to the received test information on a display screen of a display device included in the student terminal 21 (step S602). Note that the information for displaying the test screen on the display screen (the test screen information) is stored as a part of the test information in the test associated information DB 14.

Figure 15:
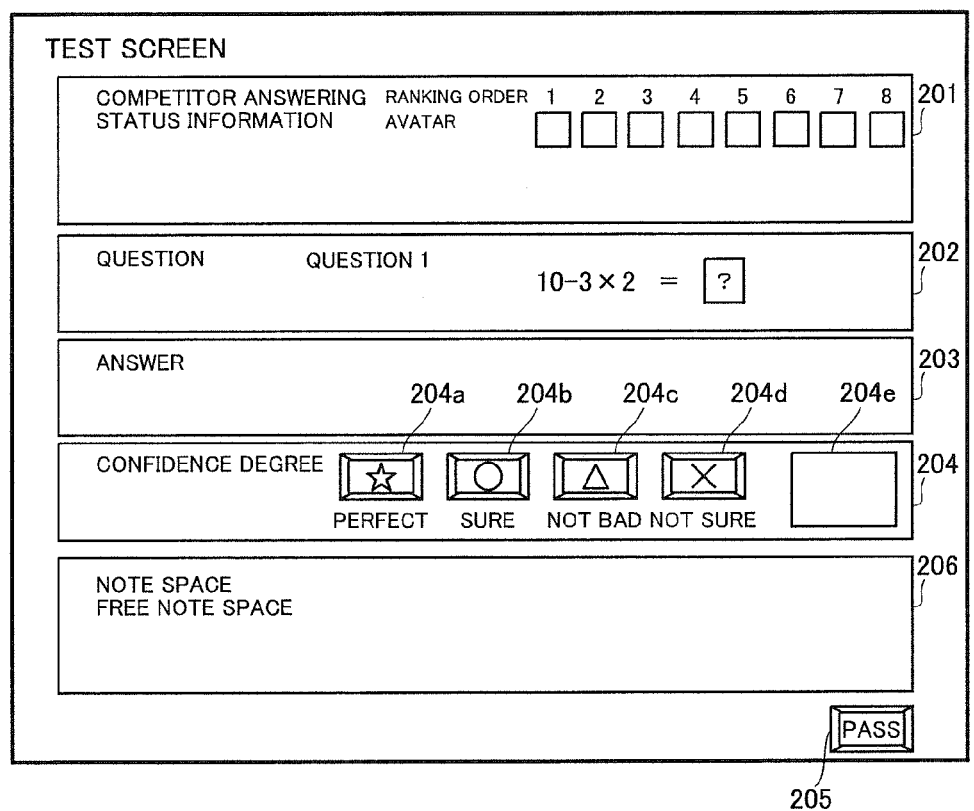
FIG. 15 is an explanatory diagram of another exemplary test screen.

FIG. 15 is an explanatory diagram of an exemplary test screen. As illustrated in FIG. 15, the test screen in the present example is provided with a competitor progress display area 201 that displays the progress of the competitor student indicated by the competitor progress information, a question display area 202 that displays a question, an answer input area 203, a confidence degree button display area 204, a pass button 205 that receives the operation for omitting the input of the answer to the question (pass operation), and a note space display area 206 that displays a note space (free note space) that the user S can use as a note space. Note that the formation of the test screen is not limited to the example. For example, the test screen preferably is provided with various buttons considered as necessary for a test such as a button that receives the operation for displaying the answered question again or an area that displays the information (for example, the remaining time for the test).

In that case, the competitor progress information indicates the progress of the test (namely, the answering status) of the user group including the user S and the competitors of the user S in the competitive relationship information (see FIG. 4). As illustrated in FIG. 15, the ranking order, the avatars, the names, and the numbers of correct answers are displayed as the competitor progress information on the competitor progress display area 201. Note that, specifically, the avatars, names, and the numbers of correct answers of the users in the user group including the user S and the competitors of the user S are displayed in descending order of the numbers of correct answers. In that case, eight users are included in the user group including the user S and the competitors of the user S, and the information about the eight users is displayed. Note that the competitor progress information will be described in detail below.

The answer input area 203 is an area on which the user S inputs an answer, for example, with a stylus pen. Note that the method for receiving an input is not especially limited. Various methods such as a button operation and a voice input can be adopted. However, the input receiving method is preferably with a high learning effect for the user S. An input receiving method in which a handwriting input can be received is preferably adopted because the handwriting is considered as a method in that the user can answer as if taking a general test. The display screen section includes a touch panel in the present example. The student terminal 21 includes a handwritten character recognition function for recognizing the answer input by the user S with a stylus pen or the like on the answer input area 203 and converting the answer into electronic data.

The confidence degree button display area 204 is an area on which the confidence degree button for receiving the input of the "confidence degree" of the user S is displayed. In that case, the "confidence degree" indicates the degree of confidence of the respondent to the answer. The user who is the respondent arbitrarily selects the confidence degree for each question in the example. As illustrated in FIG. 15, selectable four confidence buttons 204a, 204b, 204c, and 204d indicating different confidence degrees are displayed on the confidence degree display area 204. Note that, although an example in which four confidence degrees "perfect," "sure," "not bad," and "not sure" are represented with different symbols will be described in the present example, the expression of the confidence degree is not especially limited. For example, ten-level confidence degrees can be represented with numerical values. An example in which the student terminal 21 starts a process for displaying the next question in response to the fact that a confidence degree has been selected will be described in the present example. Note that, in addition to the confidence degree buttons, a button for receiving an answering completion operation (in other words, for receiving an operation for displaying the next question) (completion button) can be provided on the test screen.

The note space display area 206 is an area on which the user S inputs a memo, for example, with a stylus pen and an area on which the memo input by the user S is displayed. Note that the input receiving method is not especially limited. The memo input in the note space can be linked to the question that has been displayed on the question display area 202 at the input of the memo. The display of the memo input in the note space can be maintained regardless of the change of the question.

After the test screen has been displayed, the student terminal 21 receives the input of the answer (step S603). When determining that an answer has been input from the reception of the operation on the answer input area 203 (Y in step S603), the student terminal 21 displays the input and received answer on the answer input area 203 (step S604).

After displaying the entered and received answer, the student terminal 21 receives the input of the confidence degree (step S605). In that case, when determining that the student terminal 21 has not received the input of the confidence degree, for example, from the reception of the press of the pass button 205 (N in step S605), the student terminal 21 goes to the process in step S609 to be described below.

On the other hand, when determining that the student terminal 21 has received the input of the confidence degree from the reception of the press of one of the four confidence degree buttons 204 (Y in step S605), the student terminal 21 displays the input and received confidence degree on a confidence degree display area 204e provided in the confidence degree button display area 204 (step S606). Note that the method for displaying a selected confidence degree (method for displaying a confidence degree selection) is not limited the example. For example, in response to the reception of the operation for selecting the confidence degree button 204a by the user S, the student terminal 21 can display the confidence degree button 204a in such a way as to make the confidence degree button 204a identifiable from the other confidence degree buttons 204b, 204c, and 204d.

After displaying the confidence degree, the student terminal 21 transmits the answer information to the learning assistance server 10 (step S607). At that time, the student terminal 21 transmits the student ID of the user S, the identification information about the question, and the answer information as the answer information to the learning assistance server 10 in the present example. The identification information about the question has been displayed on the question display area 202 and the answer information has been displayed on the answer input area 203 when it has been determined that the answering has been completed. Note that the student terminal 21 also transmits the confidence degree information to the learning assistance server 10 in the present example. The confidence degree information indicates the confidence degree that has been displayed on the confidence degree display area 204e when it has been determined that the answering has been completed (in other words, the confidence degree about the answer indicated in the answer information).

After transmitting the answer information and the confidence degree information, the student terminal 21 updates the test screen based on the test information (step S608). If there is a next question, the student terminal 21 displays the test screen showing the next question on the display screen in the present example. If there is not a next question, the student terminal 21 determines that the test is over (Y in step S609), and displays the completion screen that is indicated in the test information (or has been predetermined) on the display screen (step S612) to complete the process.

On the other hand, when determining that the test is over (N in step S609), the student terminal 21 determines whether the student terminal 21 has received the competitor progress information from the learning assistance server 10 (step S610). Hereinafter, the competitor progress information will be described together with the description of the operation of the learning assistance server 10 after the distribution of the test information.

The learning assistance server 10 determines whether the learning assistance server 10 has received the answer information from the distribution destination after the distribution of the test information (step S502). When determining that the learning assistance server 10 has not received the answer information from the distribution destination (N in step S502), the learning assistance server 10 goes to the process in step S506 to be described below.

On the other hand, when determining that the learning assistance server 10 has received the answer information, for example, from the reception of the answer information transmitted from the student terminal 21 (Y in step S502), the learning assistance server 10 determines based on the test information stored in the test associated information DB 14 whether the answer indicated in the received answer information is correct (step S503). After that, the learning assistance server 10 updates the test progress information using the received answer information and determination result (step S504). The test progress information is stored at a predetermined storage region in the test associated information DB 14 in the present example. Note that the test progress information can be stored in another storage medium (not illustrated in the drawings).

FIG. 16 is an explanatory diagram of exemplary test progress information stored in the test associated information DB 14. The test progress information includes information about a student ID for uniquely specifying the student, the student name, the grade, the class, the question number, the status and the scoring results.

In that case, the "status" indicates the progress on the test, for example, includes "before the start," "under examination," and "examination completion."

As described above, when receiving the answer information transmitted from the distribution destination of the test information about the test X, the learning assistance server 10 determines whether the answer indicated in the received answer information is correct (step S503). After that, the learning assistance server 10 updates the test progress information using the received answer information and determination result (step S504).

FIG. 17 is an explanatory diagram of an example of the updated test progress information. As illustrated in FIG. 17, the learning assistance server 10 updates the test progress information by registering the answer, the confidence degree, and the result from the determination whether the answer is correct in the storage region linked to the student ID and question number indicated in the answer information.

After updating the test progress information, the learning assistance server 10 refers to the competitive relationship information to specify the competitor of the user whose test progress information has been updated (step S505). In the present example, the learning assistance server 10 specifies the user who is the distribution destinations of the test information about the test X and who is registered as the competitor of the user S.

After specifying the competitor by specifying the student ID linked as the competitor student ID to the student ID of the user S with reference to the competitive relationship information, the learning assistance server 10 generates the competitor progress information based on the test progress information to transmit the generated competitor progress information to the student terminal (Each of the student terminals used by the user S and the users who are the competitors of the user S. The terminals are specified from the student ID.) (step S506). In the present example, the learning assistance server 10 generates the information indicating the number of the question that the user S has answered and the result from the correct or incorrect determination indicating whether the answer is correct as the competitor progress information to transmit the competitor progress information to the student terminal 21 of the user S and each of the student terminals used by each users who are the competitors of the user S.

After the competitor progress information has been transmitted to the user group in which the users including the user S have competitive relationships with each other by the processes in steps S502 to S506 in the learning assistance process performed with the learning assistance server 10, the student terminal 21 receives the competitor progress information (Y in step S610) to update the test screen based on the received competitor progress information (step S611), and goes to the process in step S603.

Figure 18:
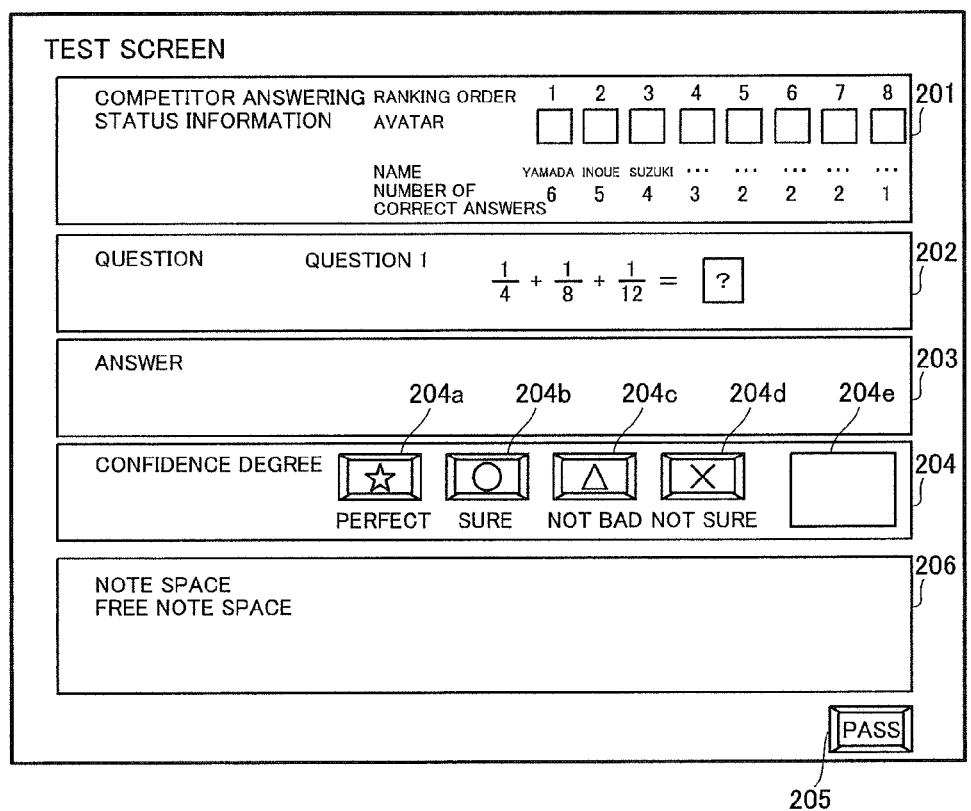
FIG. 18 is an explanatory diagram of another example of the test screen updated based on competitor progress information.

FIG. 18 is an explanatory diagram of an example of the test screen updated based on the competitor progress information. As illustrated in FIG. 18, the ranking order, the avatars, names, and the numbers of correct answers of the users are displayed in descending order of the numbers of correct answers on the competitor progress display area 201 in the test screen. Note that the progress of the user S is also displayed such that the user S can confirm his or her rank among the competitors. The form of the display of the competitor progress is not limited to the example. For example, instead of the number of correct answers, the percentage of correct answers can be displayed.

On the other hand, after transmitting the competitor progress information, the learning assistance server 10 determines whether the test time is over (step S506). For example, when determining that the test time is not over (N in step S506) according to the fact that the time elapsed since the distribution of the test information does not reach the time set as the time for answering on the test X (hereinafter, referred to as the "test time"), the learning assistance server 10 goes to the process in step S502.

On the other hand, when determining that the test time is over according to the fact that the elapsed time has reached the test time of the test X (Y in step S506), the learning assistance server 10 calculates the scoring result based on the test information stored in the test associated information DB 14 and the result from the correct or incorrect determination of each question for each student indicated the test progress information (step S507).

After scoring the answer, the learning assistance server 10 updates the test progress information based on the scoring results (step S508) and then completes the process.

FIG. 19 is an explanatory diagram of an example of the test progress information updated based on the scoring results. As illustrated in FIG. 19, the learning assistance server 10 updates the test progress information by registering the scoring results (points) of the answer by each student and registering "completion" as the status.

Similarly to the configuration in the embodiment, this can also increase the motivation for learning and thus can provide a learning assistance technique that can enhance the learning effect.

Note that, although the learning assistance server 10 distributes the test information about the test X to the distribution destinations in the embodiment, the learning assistance server 10 can includes the group information DB 12 storing the group information in which a plurality of groups predetermined according to the academic level separately from the class to which each student belongs is linked to each student who belongs to each group so as to transmit (distribute) the test information including the test question information indicating different test questions for each group with reference to the group information. This can provide questions prepared according to the level without dividing the classes according to the level, and can virtually maintain the classes divided according to the level without reorganizing the classes even when each student changes the level.

Hereinafter, an example in which the learning assistance server 10 transmits the test information including the test question information indicating different test questions for each group will be described.

Figure 20:
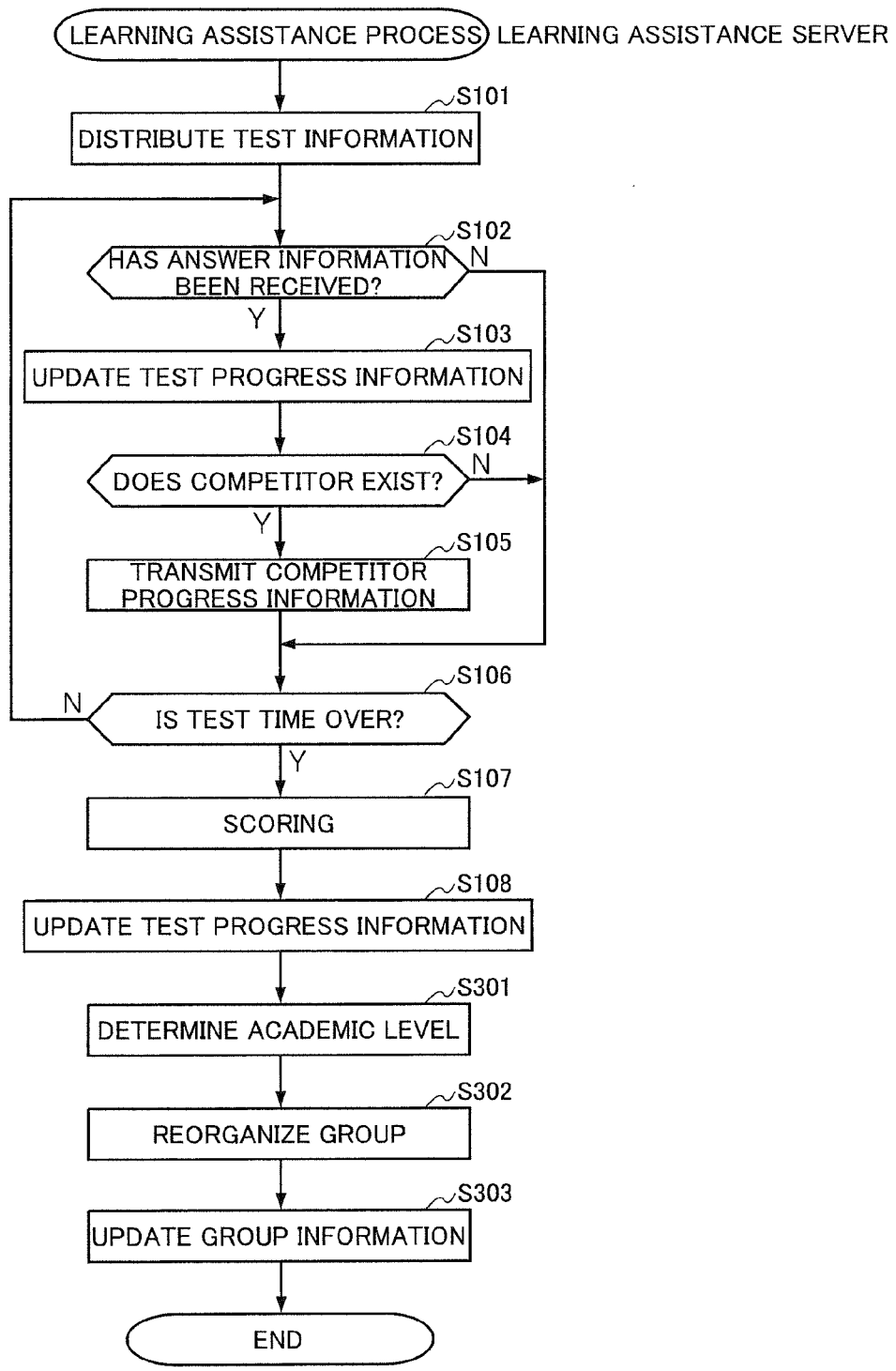
FIG. 20 is a flowchart describing another exemplary learning assistance process performed with a learning assistance server.

FIG. 20 is a flowchart describing an exemplary learning assistance process performed with a learning assistance server 10 in such a case. Note that the content described in the embodiment will be attached with the same step number as in the embodiment and the description will be omitted (see FIG. 5).

In the learning assistance process, the learning assistance server 10 determines whether the test is over (step S106). When determining that the test is over (Y in step S106), the learning assistance server 10 determines the academic level of each student based on the answering result information indicating the answering result of each student (the test progress information updated in the process of step S108 in the present example) (step S301). In the present example, the learning assistance server 10 includes the correct answer percentage information indicating the percentage of correct answers of each question and the answering time information indicating the time for answering on the test in the test progress information as the answering result information (not illustrated in the drawings) so as to determine the academic level of each student with reference to the level determination table in which the relationship between the correct answer percentage and the answering time, and the academic level (hereinafter, also merely referred to as the "level") has been predetermined.

FIG. 21 is an explanatory diagram of an exemplary level determination table. As illustrated in FIG. 21, the level determination table includes a plurality of levels and points corresponding to each level. FIG. 22 is an explanatory diagram of an exemplary time point determination table (when the test time is 20 minutes). As illustrated in FIG. 22, the time point determination table includes answering times and points corresponding to each answering time. In the present example, the point for determining the level is calculated as the sum obtained by adding the numerical value indicated as the time point determined according to the answering time to the numerical value obtained by dividing the correct answer percentage by two. Note that the rule for calculating the point and the range of points according to the level are not limited to the example, and can be any rule and any range that can appropriately classify the academic level.

After determining the academic level of each student, the learning assistance server 10 reorganizes the group to which each student belongs according to the determined academic level (step S302). Note that the learning assistance server 10 can change the academic level using the average value of the tests conducted a predetermined number of times in order to reorganize the group. In such a case, for example, the learning assistance server 10 can store the test progress information including the scoring results in a predetermined storage medium until the number of tests reaches a predetermined number of times.

After reorganizing the group, the learning assistance server 10 updates the group information according to the reorganizing result (step S303) and completes the process.

As described above, the learning assistance server 10 that transmits the test information including the test question information indicating different test questions for each group determines whether the test is over. When determining that the test is over, the learning assistance server 10 determines the academic level of each student based on the answering result information indicating the answering result of each student to reorganize the group to which each student belongs according to the determined academic level. Then, the learning assistance server 10 updates the group information. This can provide the test question corresponding to the academic level for each student with increasing his or her competitive consciousness and thus can enhance the learning effect.

While including the correct answer percentage information indicating the percentage of correct answers of each question and the answering time information indicating the time for answering on the test as the answering result information, and transmitting the test information including the test question information indicating different test questions for each group, the learning assistance server 10 determines the academic level of each student with reference to the level determination table in which the relationship between the correct answer percentage and the answering time, and the academic level has been predetermined. This can determine the academic level objectively.

Note that the method for determining the academic level is not limited to the above-mentioned method and can be any method that can develop the academic level as a point based on at least one of the points (or the correct answer percentage) and the answering time. For example, a point corresponding to each question is given to the correct answer to each question such that the academic level can be determined from the value obtained by multiplying the sum of the points by the correct answer percentage. Note that, even when the answer is incorrect, a part of the point can be given to the incorrect answer when the answer is evaluable. Furthermore, in addition to the points or the answering time, another point determined, for example, based on the number of consecutive correct answers, or a point obtained by quantifying, for example, the evaluation of communication skills in school by the teacher can be taken into consideration.

Note that, although not especially described in the embodiment, the learning assistance server 10 and the student terminals 21 to 23 and 31 to 33 perform the various processes described above (for example, see FIGS. 5, 6, 13, 14, and 20) with following the processing program (learning assistance process program) stored in the storage media thereof.

REFERENCE SIGNS LIST

10 Learning assistance server
11 Student information DB
12 Group information DB
13 Competitive relationship information DB
14 Test associated information DB
21 to 23, 31 to 33 Student terminal
40 Communication network
100 Learning assistance system

The invention claimed is:

1. A learning assistance system comprising:
   student terminals operated by students; and
   a learning assistance server connected to the student terminals through a communication network,
   wherein the learning assistance server includes:
   a test associated information storage unit that stores test associated information including test question information indicating test questions, test answer information indicating correct answers to the test questions, test progress information indicating test progress of each of the students and a correct or incorrect determination of each answer of each of the students, and test screen information indicating a test screen to be displayed on each of the student terminals, each of the test screens including a question display area that displays the test questions, an answer input area in which the answer is to be input, and a competitor progress display area that displays ranking order of one student and one competitor student regarded as a competitor of the one student and having a competitive relationship with the one student;
   a competitive relationship information storage unit that stores competitive relationship information indicating the competitive relationships between the students and in which the one student is linked to the one competitor student of the one student;
   a test information transmission unit that transmits test information including the test question information and the test screen information to each of the student terminals;
   an answer information reception unit that receives answer information indicating the answer to each of the test questions input to the answer input area displayed on each of the student terminals;
   a correct or incorrect determination unit that determines whether the answer to each of the test questions indicated in the answer information received in the answer information reception unit is correct, with reference to the correct answers to the test questions indicated in the test answer information;
   a test progress information update unit that updates the test progress information indicating the test progress of each of the students and the correct or incorrect determination of each answer of each of the students based on the answer information indicating the answer to each of the test questions and determination result determined in the correct or incorrect determination unit;
   a competitor determination unit that determines with reference to the competitive relationship information whether the test progress information of the one competitor student linked to the one student has been updated;
   a competitor progress information generation unit that, when the competitor determination unit determines that the test progress information of the one competitor student has been updated, generates competitor progress information indicating the ranking order of the one student and the one competitor student based on the test progress information updated in the test progress information update unit; and
   a competitor progress information transmission unit that transmits the competitor progress information generated with the competitor progress information generation unit to the student terminal of the one student to whom the one competitor student is linked in order to display the ranking order of the one student and the one competitor student in the competitor progress display area displayed on the student terminal of the one student,
   wherein the student terminal of each of the students includes:
   a test screen display unit that displays the test screen indicated in the test screen information transmitted from the test information transmission unit of the learning assistance server, on the student terminal of each of the students;
   an answer input reception unit that receives an input of the answer to the answer input area displayed on the student terminal of each of the students through the test screen display unit; and
   an answer transmission unit that transmits the answer information indicating the answer received with the answer input reception unit at each of the test questions, to the answer information reception unit of the learning assistance server,
   wherein the test screen display unit displays the ranking order of the one student and the one competitor student indicated in the competitor progress information, in the competitor progress display area displayed on the student terminal of the one student when receiving the competitor progress information from the competitor progress information transmission unit of the learning assistance server,
   wherein the competitor progress information further includes answered question information indicating a test question that the one competitor student has answered among the test questions;
   wherein the test associated information storage unit of the learning assistance server stores the test associated information including the test progress information further indicating confidence degree of the answer of each of the students,
   the test screen indicated in the test screen information further includes a confidence degree selection area in which the confidence degree of the answer input to the answer input area is selected,
   the test information transmission unit of the learning assistance server transmits the test screen information indicating the test screen further including the confidence degree selection area, to the test screen display unit of the student terminal,
   the test screen display unit of the student terminal displays the confidence degree selection area on the student terminal,
   the answer input reception unit of the student terminal receives a selection of the confidence degree in the confidence degree selection area,
   the answer transmission unit of the student terminal transmits confidence degree information indicating the confidence degree selected in the confidence degree selection area, to the answer information reception unit of the learning assistance server, the answer information reception unit of the learning assistance server further receives the confidence degree information indicating the confidence degree selected in the confidence degree selection area, the test progress information update unit of the learning assistance server updates the test progress information further indicating the confidence degree of the answer of each of the students based on the confidence degree indicated in the confidence degree information received in the answer information reception unit of the learning assistance server, the competitor progress information generation unit of the learning assistance server generates the competitor progress information further including the confidence degree information indicating the confidence degree selected on the confidence degree selection area displayed on the student terminal of the one competitor student, and the competitor progress information transmission unit transmits the competitor progress information including the answered question information and the confidence degree information to the test screen display unit of the student terminal of the one student in order to display the test question that the one competitor student has answered among the test questions, and the confidence degree selected in the confidence degree selection area displayed on the student terminal of the one competitor student, on the competitor progress display area displayed on the student terminal of the one student;

wherein the competitor progress display area of the test screen indicated in the test screen information further displays total numbers of the correct answers of the one student and the one competitor student, the test associated information storage unit of the learning assistance server stores the test associated information including the test progress information further indicating the total numbers of the correct answers of each of the students, the test progress information update unit updates the test progress information further indicating the total numbers of the correct answers of each of the students based on the answer information indicating the answer to each of the test questions and the determination result determined in the correct or incorrect determination unit, the competitor progress information generation unit generates the competitor progress information further indicating the total numbers of correct answers of the one student and the one competitor student based on the test progress information updated in the test progress information update unit, and the competitor progress information transmission unit transmits the competitor progress information generated with the competitor progress information generation unit to the test screen display unit of the student terminal of the one student in order to display the total number of correct answers of the one student and the one competitor student in the competitor progress display area displayed on the student terminal of the one student; and wherein the confidence degree selection area further displays buttons indicating different confidence degrees to select the confidence degree of the answer to each of the questions, the test screen indicated in the test screen information further includes a note space area that displays a note space, the test information transmission unit of the learning assistance server transmits the test screen information indicating the test screen further including the note space area to each of the student terminals, and the test screen display unit of the student terminal displays the test screen further including the note space area.

2. The learning assistance system according to claim 1, wherein the test information transmission unit transmits the test information only to the test screen display unit of the student terminal of each of the students selected as a distribution destination of the test questions.

* * * * *